Patented May 2, 1933

1,906,840

UNITED STATES PATENT OFFICE

JAMES WILLIAM COADY, OF HALIFAX, NOVA SCOTIA, CANADA

LUBRICATING MEANS FOR JOURNAL BEARINGS

Application filed September 25, 1931. Serial No. 565,081.

The invention relates to a lubricating means for journal bearings as described in the present specification and illustrated in the accompanying drawings which form part of the same.

The invention consists essentially in the novel form of lubricant pan and means for retaining it in position in relation to the shaft as pointed out in the claims for novelty following a description in detail of the preferred construction.

The objects of the invention are to facilitate the lubrication of shafts and shaft bearings, particularly car axles and railway journal boxes and to maintain this lubrication for a considerable time and distance thereby enabling a railway train of cars to proceed on its journey without danger from hot boxes and in this way avoid the numerous delays that are caused in the transportation of freight and passengers through the bearings running hot; to enable the workmen such as oilers, to attend to the means of lubrication by the very simple expedient of dropping the pan and refilling with oil or grease as the case may be; to eliminate the wear and tear of shafts and axles generally and supply in this art a device of extremely simple and yet efficient construction; and generally to provide a bearing pan that will retain the lubricant for the maximum period and be readily recharged.

In the drawings, Figure 1 is a perspective view of the assembled device.

Like numerals of reference indicate corresponding parts in the various figures.

Figure 1:
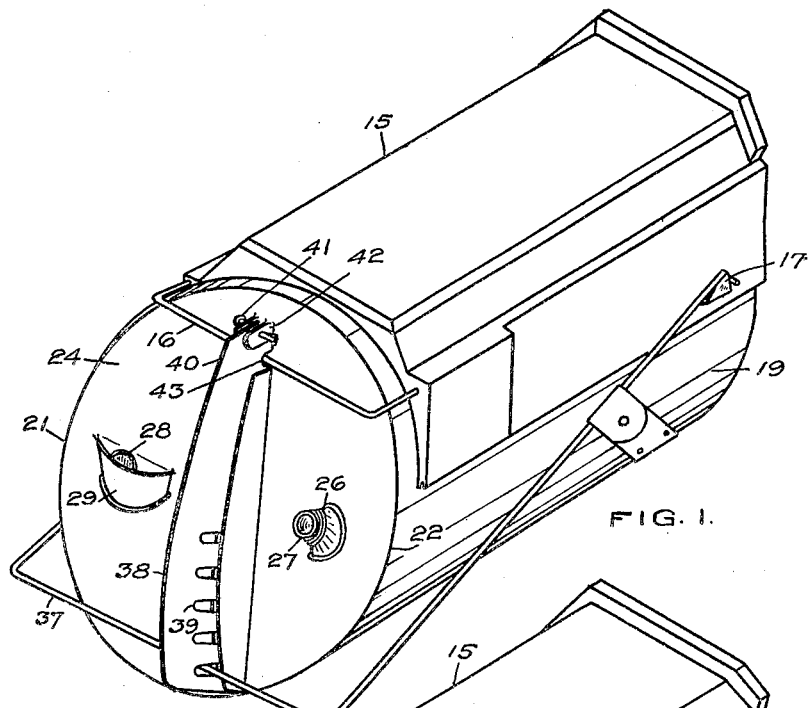
Figure 2:
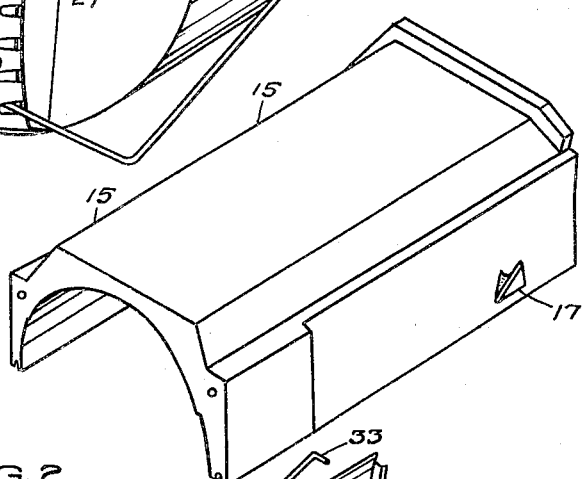
Figure 2 is a perspective detail of the bearing member, usual to railway car construction.
Figure 3:
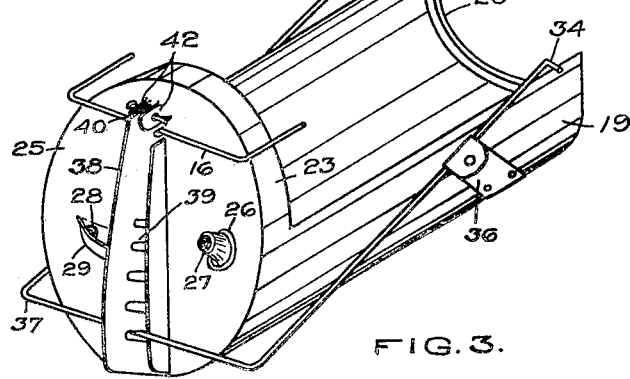
Figure 3 is a perspective detail of the lubrication pan.
Figure 4:
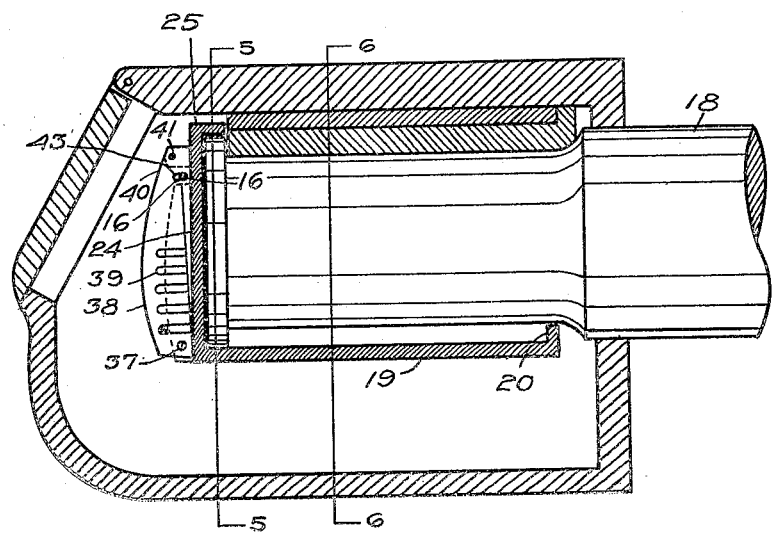
Figure 4 is a longitudinal mid-sectional view of the device enclosed in a journal box.
Figure 5:
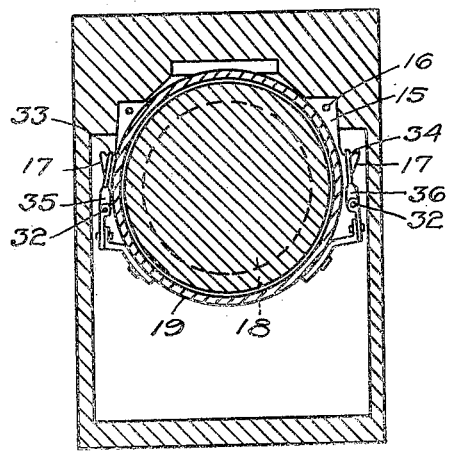
Figure 5 is an enlarged cross sectional view of the device on the lines 5—5 in Figure 4 showing the full section.
Figure 6:
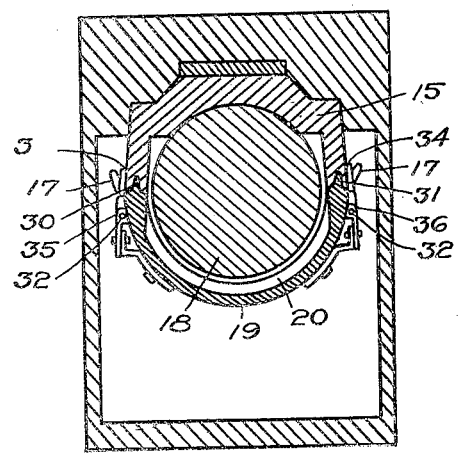
Figure 6 is an enlarged cross sectional view on the lines 6—6 in Figure 4 showing the full section.

Referring to the drawings, the bearing block is indicated by the numeral 15 and in most respects is of conventional form having slight additions for the purpose of applying the particular lubrication pan as set forth hereinafter.

The stay rod 16 is in yoke form having its ends rigidly secured in the front end portion of the bearing block 15 while towards the rear end of the block the catches 17 are secured to the sides of the bearing block wall respectively, the shaft 18 as customary turns in the bearing block 15. The lubrication pan 19 is of arcuate shape in cross section and at the inner end has the arcuate flange 20 for retaining the grease or oil under the shaft, while at the front end, the side walls 21 and 22 are continued at 23, closed in by the face 24 to form the cap 25 which as will be seen is integral with the pan itself. The feed orifice 26 is formed with an inclined rim 27 for the purpose of inserting the lubricant, this feed orifice 26 being to one side of the center of the face 24, while the orifice 28 is arranged on the other side over which the cup form of shield 29 is shown.

The upper edges of the side walls 21 and 22 fit into corresponding groves 30 and 21 in the lower edge face surfaces of the bearing block 15 and the spring locking rod 32 of U-form holds the pan to the bearing block 15. This locking rod 32 is offset at the ends 33 and 34 and extends through the strap loops 35 and 36, these strap loops being securely riveted to the side walls 21 and 22 intermediate of the length of these side walls. The offset ends 33 and 34 are caught in the catches 17 while the bale end 37 of the rod is brought over the face 24. The pivoted locking rack 38 is formed with a plurality of slots 39 made from its inner side and is offset at the upper end 40, this offset end 40 being pivotally mounted on the pin 41 securely fastened in the lugs 42, projecting outwardly from the face 24.

The stay rod 16 extends into a slot 43 in the upper end or head 40 of the rack 38 in the assembled position of the box, while the locking rod 32 at its bale end 37 is inserted in one or other of the slots 39. The cap 25 in its assembled position is introduced behind the stay rod 16, consequently this cap and of course the pan is securely held to said bearing block.

In the operation of this invention the pan is filled with grease or oil as the case may be, preferably with grease, as that usually accomplishes the lubrication of the axles and bearings for a considerable distance, and when it is necessary to replace this grease, the bale end 37 of the locking rod 32 is withdrawn from the slot so that the face of the pan may be withdrawn from the stay rod 16 and then the pan is repacked with grease.

This may be done as often as necessary but in the intervals between repacking, oil can be readily fed into the bearing so that it is not necessary on all occasions to release the pan.

What I claim is:

1. In means for lubricating journal bearings, a bearing block of arcuate shape in cross section and a pan having a head and longitudinally held to said bearing block, a stay rod in yoke form rigidly secured in the front end portion of said bearing block and extending through a slot in the head of said pan.

2. In means for lubricating journal bearings, a bearing block of arcuate shape in cross section, and a pan having a head with extending lugs and feed orifices, a locking rack having a plurality of slots and pivotally mounted in between said lugs, a stay rod and a locking rod extending through certain of the slots of said locking rack and secured at their ends to said bearing block.

3. In means for lubricating journal bearings, a bearing block of arcuate shape in cross section, a pan formed of arcuate shape in cross section and having a flange at the inner end and a face at the other end, the latter having parallel lugs and feed orifices, strap loops secured to the side walls of said pan and catches secured to the side walls of said bearing block, a locking rack having a plurality of slots and pivotally mounted between the parallel lugs of the face of said pan, a stay rod extending through one of the upper slots of the locking rack and terminating in recesses of the bearing block, a locking rod extending through one of the lower slots of the locking rack in yoke form extending through one of the slots of the locking rack and pivotally supported by means of the strap loops of said pan and offset at the ends and adapted to engage with the catches of said bearing block.

Signed at Halifax, Nova Scotia, this 27th day of July, 1931.

JAMES WILLIAM COADY.